United States Patent Office 3,105,829
Patented Oct. 1, 1963

3,105,829
MONOAZO DYESTUFFS OF THE
BENZOTHIAZOL SERIES
Ernest Merian, Bottmingen, and Bruno J. R. Nicolaus, Basel, Switzerland, assignors to Sandoz Ltd., Basel, Switzerland
No Drawing. Filed Feb. 3, 1959, Ser. No. 790,814
Claims priority, application Switzerland Feb. 5, 1958
7 Claims. (Cl. 260—158)

The present invention relates to monoazo dyestuffs of the benzothiazol series which correspond to the formula

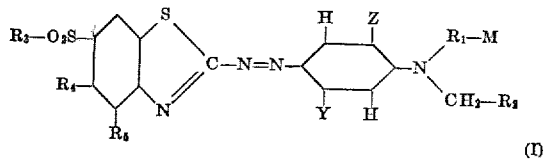

wherein
$R_1$ stands for an alkylene radical with 1 to 4 carbon atoms,
$R_2$ for hydroxyalkyl, dihydroxyalkyl, alkoxyalkyl, acetoxyalkyl which may be further substituted, cyanoalkyl, difluoromethyl, trifluoromethyl, fluorated cyanoalkyl, carbalkoxyalkyl or a carbamic acid alkyl ester radical,
$R_3$ for an alkyl or alkylene radical with 1 to 4 carbon atoms or an amino group which may be substituted by one or two alkyl, aralkyl, cycloalkyl or aryl radicals which may contain further substituents,
$R_4$ for hydrogen or alkyl with 1 to 4 carbon atoms,
$R_5$ for halogen, nitro or the sulfonic acid group,
M for hydrogen, hydroxy or alkoxy, acetoxy which may be further substituted, or a carbamic acid ester radical,
Y for hydrogen, halogen, low molecular alkyl or alkoxy, trifluoromethyl, trifluoroacetyl amino or an alkanoylamino radical with not more than 18 carbon atoms, and
Z for hydrogen, halogen, low molecular alkyl or alkoxy or together with

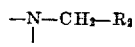

and the adjacent benzene nucleus a tetrahydroquinoline ring.

The process for the production of the new monoazo dyestuffs of the benzothiazol series consists in diazotizing 1 mol of an amine of the formula

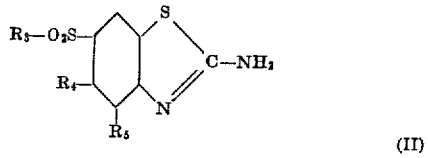

wherein $R_3$, $R_4$ and $R_5$ possess the above-cited meanings and coupling the diazo compound thus obtained with 1 mol of a coupling component of the formula

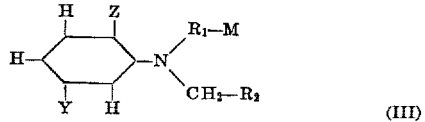

wherein $R_1$, $R_2$, M, Y and Z possess the above-cited meanings.

Certain of the amines of the Formula II must be diazotized under special conditions. Some of them form very poorly soluble sulfates and therefore cannot be diazotized in concentrated sulfuric acid. In such cases diazotization can be carried out, for example, in phosphoric acid.

The diazo compounds are coupled with the coupling components in an acid medium, which may be buffered if necessary.

A number of the new insoluble monoazo dyestuffs dye from aqueous suspension synthetic polyamide fibers (e.g. nylon, "Perlon," registered trademark), cellulose ester fibers (e.g. secondary cellulose acetate and cellulose triacetate), polyvinyl fibers, polyacrylonitrile fibers (e.g. "Orlon," "Acrilan," registered trademarks) and polyester fibers (e.g. "Terylene," "Dacron," registered trademarks) in brilliant red and violet shades. The dyeings are characterized by very good fastness to light, washing, perspiration, gas fumes, water and sea water, and are white dischargeable. Cotton, wool and viscose rayon are reserved.

In addition, some of the new dyestuffs are suitable for pigmenting lacquers, oils, and synthetic resins, and for dyeing man-made fibers in the mass. The shades they produce in spun-dyed cellulose acetate possess high fastness to light, washing, perspiration, water, sea water, soaping, cross dyeing, alkaline bleaching, oxalic acid, dry cleaning, peroxide bleaching, rubbing, decatizing, and pressing.

Those of the new monoazo dyestuffs which contain free sulfonic acid groups dye wool, silk, animalized cellulosic fibers, and the polyamide fibers nylon, "Perlon" and "Rilsan" (registered trademarks), and also polyacrylonitrile fibers by the cuprous ion dyeing method. On these fibers they yield red or violet shades which are fast to light, washing, milling, sea water, perspiration, sublimation, pleating and heat setting.

This latter group of dyestuffs is also suitable for the pigmentation of lacquers, oils, synthetic resins, and the dyeing of man-made fibers in the mass, being applied where necessary after laking with suitable cations. In these materials the dyestuffs exhibit good fastness to light, gas fumes and wet treatments.

It may be noted that there was no reason to expect that brilliant red, violet and blue monoazo dyestuffs could be obtained from these new diazo compounds, because the comparable 2.6-disubstituted 1-aminobenzene-4-sulfones and -sulfonic acid amides yield only dull orange monoazo dyestuffs.

The amines of the Formula II are produced by treating 1 mol of a compound of the formula

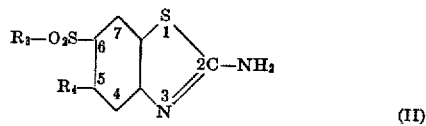

wherein $R_3$ and $R_4$ possess the aforecited meanings, with halogenating, nitrating or sulfonating agents.

2-amino-4-halogenobenzothiazol, 2-amino-4-nitrobenzothiazol and 2-amino-4-sulfobenzotriazol compounds have either been unknown hitherto or have been obtainable only by circuitous methods giving poor yields; in view of this is was by no means expected that they could be obtained in this simple manner.

A further process for the production consists in converting 1 mol of a compound of the formula

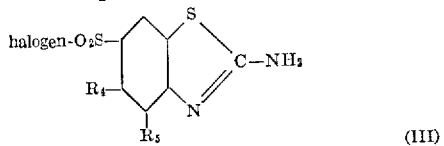

wherein $R_4$ and $R_5$ possess the aforecited meanings, the free amino group of which may be protected by a readily spltitable acyl radical, into sulfinic acid and alkylating this by the normal methods, or alternatively by reacting the aforesaid compound with ammonia, which may be substituted by alkyl, aralkyl, cycloalkyl or aryl radicals which may contain further substituents, and subsequently splitting off the acyl radical in the reaction product when present. This process of acid amide formation is carried out preferably in presence of an acid-binding agent or with the aid of an excess of the amine.

When an acyl radical is present it can be split off in the normal way by alkaline or acid hydrolysis, preferably at high temperature.

The amines are isolated by one of the common basic operations, e.g. filtration, evaporation of the solvent, salting out, precipitation from the solvent with a suitable agent, etc., where necessary after neutralization of the hydrolysing solution.

The amines are valuable intermediate products which find employment in the production of dyestuffs and pharmaceutical products.

In the following examples the parts and percentages are by weight and the temperatures in degrees centigrade. The melting points are uncorrected.

Example 1: 5.5 parts of 2-amino-4-nitro-6-methylsulfonlybenzothiazol are ground with 200 parts of phosphoric acid and 300 parts of glass balls for 4½ hours in a glass flask. A fine suspension is formed which is separated from the glass balls and diazotized at 5° with 1.6 parts of solid sodium nitrite. After 1½ hours, 5 parts of N-cyanoethyl-N-hydroxyethylaminobenzene are added with vigorous stirring upon which coupling takes place instantaneously. The dark blue suspension is diluted with 250 parts of water and the product filtered off, washed free of acid, and dried. It is obtained as a dark powder which dissolves in acetic acid ethyl ester to give violet solutions. The new dyestuff probably corresponds to the formula

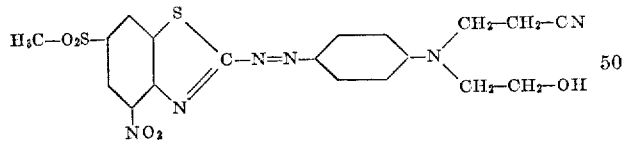

Applied from aqueous suspension at high temperature, preferably in presence of compounds with dispersing action, the dyestuff dyes cellulose acetate fibers in brilliant violet shades which have good fastness to light, gas fumes, sublimation, and wet treatments, and are readily dischargeable.

When in place of N-hydroxyethyl-N-cyanoethylaminobenzene, aliquot amounts of N-hydroxyethyl-N-difluoroethylaminobenzene or 1-(N-hydroxyethyl-N-cyanoethyl)-amino-3-methylbenzene are employed, similar dyestuffs are obtained which possess virtually the same standard of light fastness.

Again, by using as coupling components 1-N.N-di-(hydroxyethyl)-amino-3-methylbenzene, 1-N.N-di-(hydroxyethyl)-amino-3-acetylaminobnezene, 1-N.N-di-(hydroxyethyl)-amino-3-acetylamino-6-methoxybenzene, 1-N.N-di-(acetoxyethyl)-amino-3-propionylaminobenzene, further dyestuffs of a slightly more bluish shade are obtained, some of which show better fastness to washing. Similar dyestuffs are obtained with 2-diazo-4-nitrobenzothiazol-6-sulfonic acid amides.

The 2-amino-4-nitro-6-methylsulfonylbenzothiazol used as diazo component is produced in the following manner:

22.8 parts of 2-amino-6-methylsulfonylbenzothiazol are dissolved in 90 parts of 96% sulfuric acid at 10°, about 4 hours being required for complete solution. After cooling to 5°, 12.6 parts of a mixture of acids consisting of 50% of sulfuric acid and 50% of nitric acid are dropped into the solution. The nitration mixture is stirred for 3 hours at 0° and for the following 24 hours at 20°, after which it is run into 1000 parts of icewater. The yellow suspension is filtered off, washed free of acid, and dried. The 2-amino-4-nitro-6-methylsulfonylbenzothiazol formed melts at 294–305° in the crude state.

A dyebath is prepared with 1 part of the above-described dyestuff dispersed with the aid of Turkey red oil, 6 parts of a sulfonated fatty alcohol and 3000 parts of water. 100 parts of secondary cellulose acetate fabric are introduced into the bath at room temperature; the temperature is raised to 80° in 1 hour and the bath maintained at this temperature for a further hour. After this time the dying process is completed and the material is removed, rinsed and dried.

In the following Table 1 further monoazo dyestuffs are recited which may be produced in an analogous manner and which correspond to the formula

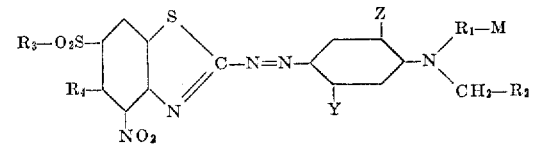

*Table 1*

| Example No. | $R_1$ | Y | $R_3$ | $R_4$ | M | $R_2$ | Z | Shade |
|---|---|---|---|---|---|---|---|---|
| 2 | $CH_2$ | H | $CH_3$ | H | H | $CH_2-CN$ | H | Red violet. |
| 3 | $C_2H_4$ | H | $CH_3$ | H | H | $CH_2-CN$ | H | Do. |
| 4 | $C_3H_6$ | H | $CH_3$ | H | H | $CH_2-CN$ | H | Do. |
| 5 | $C_4H_8$ | H | $CH_3$ | H | H | $CH_2-CN$ | H | Do. |
| 6 | $C_2H_4$ | H | $CH_3$ | H | H | $CH_2-CN$ | H | Violet. |
| 7 | $C_2H_4$ | $CH_3$ | $CH_3$ | H | H | $CH_2-O-CO-CH_3$ | H | Do. |
| 8 | $C_2H_4$ | $CH_3$ | $CH_3$ | H | H | $CH(OH)-CH_2-OH$ | H | Do. |
| 9 | $C_2H_4$ | $CH_3$ | $CH_3$ | H | H | $CHF_2$ | H | Do. |
| 10 | $C_2H_4$ | $CH_3$ | $CH_3$ | H | H | $CF_3$ | H | Red violet. |
| 11 | $C_2H_4$ | H | $CH_3$ | H | H | $CH(CF_3)CN$ | H | Ruby. |
| 12 | $C_2H_4$ | $CH_3$ | $CH_3$ | H | H | $CH_2-CO-O-CH_3$ | H | Violet. |
| 13 | $CH_2$ | H | $CH_3$ | H | H | $CH_2-CO-O-CH_3$ | H | Red violet. |
| 14 | $CH_2$ | H | $NH-CH_3$ | H | H | $CH_2-CN$ | H | Do. |
| 15 | $CH_2$ | H | $N(CH_3)_2$ | H | H | $CH_2-CN$ | H | Do. |
| 16 | $CH_2$ | H | $N(CH_3)CH_2-CH_2-OH$ | H | H | $CH_2-CN$ | H | Do. |
| 17 | $CH_2$ | H | $NH-CH_2-CH_2-CH_2-O-CH_3$ | H | H | $CH_2-CN$ | H | Do. |
| 18 | $C_2H_4$ | H | $NH-CH_3$ | H | H | $CH_2-CN$ | H | Do. |
| 19 | $C_2H_4$ | H | $N(CH_3)_2$ | H | H | $CH_2-CN$ | H | Do. |
| 20 | $C_2H_4$ | H | $NH-CH_2-CH_2-CN$ | $CH_3$ | OH | $CH_2-CN$ | H | Do. |
| 21 | $C_2H_4$ | $NH-CO-CH_3$ | $CH_3$ | H | H | $CH(OH)-CH_2-OH$ | H | Violet. |
| 22 | $C_2H_4$ | $NH-CO-CH_3$ | $CH_3$ | H | OH | $CH_2-OH$ | $OCH_3$ | Blue. |
| 23 | $C_2H_4$ | $NH-CO-CH_3$ | $N(CH_3)_2$ | H | H | $CH(OH)-CH_2-OH$ | $OC_2H_5$ | Do. |
| 24 | $C_2H_4$ | $NH-CO-CH_3$ | $N(CH_3)_2$ | H | OH | $CH_2-OH$ | $CH_3$ | Violet. |
| 25 | $C_2H_4$ | $NH-CO-CF_3$ | $CH_3$ | H | H | $C_2H_4-OH$ | Cl | Do. |
| 26 | $C_2H_4$ | $NH-CO-CH_3$ | $CH_3$ | H | OH | $CH_2-OH$ | Br | Do. |
| 27 | $C_2H_4$ | $NH-CO-CH_3$ | $NH-CH_3$ | H | OH | $CH_2-OH$ | Br | Do. |

Table I—Continued

| Example No. | R₁ | Y | R₃ | R₄ | M | R₂ | Z | Shade |
|---|---|---|---|---|---|---|---|---|
| 28 | C₂H₄ | NH-CO-CH₃ | NH-C₂H₅ | H | H | CH(OH)-CH₂-OH | C₂H₅ | Violet. |
| 29 | C₂H₄ | NH-CO-CH₃ | N(CH₃)₂ | H | OH | CH₂-OH | OCH₃ | Blue. |
| 30 | C₂H₄ | NH-CO-CH₃ | CH₃ | H | H | CH(OH)-CH₂-OH | OC₂H₅ | Do. |
| 31 | C₂H₄ | NH-CO-CH₃ | NH-CH₃ | H | OH | CH₂-OH | H | Violet. |
| 32 | C₂H₄ | NH-CO-C₂H₅ | NH-C₂H₅ | H | OH | CH₂-OH | O-CH₃ | Blue. |
| 33 | C₂H₄ | NH-CO-C₂H₅ | N(CH₃)₂ | H | OH | CH₂-OH | O-C₂H₅ | Do. |
| 34 | C₂H₄ | Cl | CH₃ | H | H | CH₂-OH | H | Pink. |
| 35 | C₂H₄ | NH-CO-CH₃ | CH₃ | C₂H₅ | O-CO-CH₃ | CH₂-O-CO-CH₃ | H | Red violet. |
| 36 | C₂H₄ | Cl | CH₃ | C₄H₉ | H | CH₂-OH | H | Pink. |
| 37 | C₂H₄ | NH-CO-CH₃ | CH₃ | H | O-CO-CH₃ | CH₂-O-CO-CH₃ | H | Red violet. |
| 38 | C₂H₄ | CH₃ | CH₃ | H | H | CH₂-O-CO-NH-CH₃ | H | Violet. |
| 39 | C₂H₄ | NH-CO-C₂H₅ | CH₃ | H | O-CO-C₂H₅ | CH₂-O-CO-C₂H₅ | H | Red violet. |
| 40 | C₂H₄ | H | CH₃ | H | H | -CH₂-CH₂- | | Red violet. |
| 41 | C₂H₄ | CH₃ | CH₃ | H | OH | -CH₂-CH₂- | | Blue. |
| 42 | C₄H₈ | CH₃ | CH₃ | H | H | -CH₂-CH₂- | | Do. |
| 43 | C₄H₈ | Cl | CH₃ | H | H | -CH₂-CH₂- | | Do. |
| 44 | C₄H₈ | CH₃ | C₂H₅ | H | H | -CH₂-CH₂- | | Do. |
| 45 | C₄H₈ | H | N(CH₃)₂ | H | H | -CH(OH)-CH₂- | | Do. |
| 46 | C₄H₈ | CH₃ | N(CH₃)₂ | H | H | -CH₂-CH₂- | | Do. |
| 47 | C₄H₈ | H | N(CH₃)₂ | C₃H₇ | H | -CH₂-CH₂- | | Do. |
| 48 | C₂H₄ | Cl | N(CH₃)₂ | H | H | | H | Pink. |
| 49 | C₂H₄ | NH-CO-C₂H₅ | N(CH₃)₂ | H | O-CO-CH₃ | CH₂-OH | H | Red violet. |
| 50 | C₂H₄ | Cl | N(CH₃)₂ | H | H | CH₂-O-CO-CH₃ | H | Pink. |
| 51 | C₂H₄ | NH-CO-C₂H₅ | N(CH₃)₂ | H | O-CO-C₂H₅ | CH(OH)-CH₂-OH | H | Red violet. |
| 52 | C₂H₄ | CH₃ | N(CH₃)₂ | H | H | CH₂-O-CO-C₂H₅ | H | Violet. |
| 53 | C₂H₄ | C₂H₅ | N(CH₃)₂ | H | OH | CH₂-O-CO-NH-C₄H₉ | H | Do. |
| 54 | C₂H₄ | H | N(CH₃)₂ | H | H | CH₂-OH | H | Do. |
| 55 | C₂H₄ | CH₃ | N(CH₃)₂ | H | OH | -CH₂-CH₂- | | Blue. |
| 56 | C₂H₄ | CH₃ | N(CH₃)₂ | H | H | -CH₂-CH₂- | | Do. |
| 57 | C₂H₄ | H | N(CH₃)₂ | H | OH | -CH₂-CH₂- | | Do. |
| 58 | C₂H₄ | Cl | N(CH₃)₂ | H | H | -CH₂-CH₂- | | Do. |
| 59 | C₂H₄ | CH₃ | N(CH₃)₂ | H | OH | -CH(OH)-CH₂ | | Do. |

Example 60: 45 parts of concentrated sulfuric acid are heated to 60° and at this temperature 3.8 parts of sodium nitrite are added. The mixture is stirred for 1 hour at 60–70° and then cooled to 10°, at which temperature is added a finely ground suspension of 15.4 parts of the 2-amino-6-methylsulfonylbenzothiazol-4-sulfonic acid, in 84 parts of glacial acetic acid and 16 parts of propionic acid. The diazotizing mixture is stirred for 3 hours at 10–20°, then 9 parts of N-ethyl-N-hydroxyethylaminobenzene are added. After stirring for 15 minutes the mass is poured into a mixture of 250 parts of ice and 200 parts of water, whereupon the dark colored product precipitates. It is filtered off, washed until of neutral reaction, and dried. The new dyestuff does not melt even at 250° and is insoluble in acetone. At low temperatures it is moderately soluble, and at high temperatures well soluble, in 10% sodium hydroxide solution. It dyes wool, silk and nylon from an acetic acid bath in bright red-violet shades, but reserves hydrophobic fibers in this dyeing medium.

In an analogous manner the dyestuff

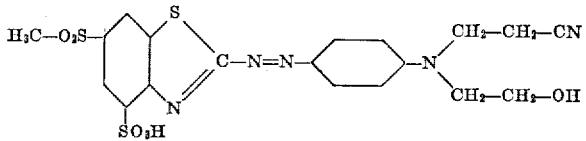

is obtained from N-cyanoethyl-N-hydroxyethylaminobenzene. It also is insoluble in acetone and dyes nylon, wool and silk from an acetic acid bath in bright red shade, and is likewise suitable for the dope dyeing of cellulose acetate. For the latter purpose the dyestuffs of the formulae

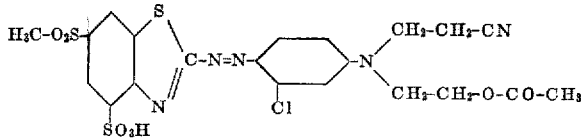

and

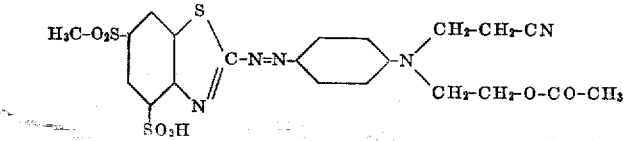

are especially suitable, as are the lakes prepared from them.

The 2 - amino-6-methylsulfonylbenzothiazol-4-sulfonic acid is obtained as follows:

100 parts of 2-amino-6-methylsulfonylbenzothiazol are added to 1000 parts of oleum with a content of 27% of SO₃. The temperature of the mixture increases by self-generation of heat to 48°, at which point complete solution occurs. It is stirred for 2½ hours at 48° and for the next 10 hours at room temperature. The homogeneous solution is run onto 3500 parts of ice, upon which the reaction product precipitates, while small amounts of the unmodified starting product remain in solution. The resultant 2-amino-6-methylsulfonylbenzothiazol-4-sulfonic acid is filtered off, washed until of neutral reaction, and dried. The new acid does not melt even at 250°; it dissolves in an aqueous solution of dimethylamine, but not in dilute acids nor in dimethylformamide or phosphorus oxychloride.

Example 61: 15.35 parts of 2-amino-4-bromo-6-methylsulfonylbenzothiazol are diazotized as described in Example 60. The diazo compound obtained is added to a solution of 10 parts of N-cyanoethyl-N-hydroxyethylaminobenzene in 100 parts of glacial acetic acid. After stirring for 15 minutes at 20° the mixture is poured onto 250 parts of ice and 200 parts of water, upon which the new dyestuff precipitates as a dark red powder. It is filtered off, washed until of neutral reaction, and dried. It is well soluble in alcohol, dioxane and ethyl acetate, giving bluish red solutions. The dyestuff dyes cellulose acetate and triacetate and polyester fibers from aqueous suspension in brilliant bluish red shades which have very good fastness to light, washing, perspiration, sublimation and pleating, besides being readily dischargeable. Cotton, viscose and wool are reserved.

2-amino-4-bromo-6-methylsulfonylbenzolthiazol is prepared as follows:

46 parts of 2-amino-6-methylsulfonylbenzothiazol are dissolved in a warm mixture of 766 parts of glacial acetic acid and 144 parts of propionic acid. The solution is cooled to 0° with stirring, causing the amine to be precipitated in a fine form. A solution of 35 parts of bromine in 50 parts of glacial acetic acid and 10 parts of propionic acid is then added in portions. The reaction mixture is stirred overnight at room temperature and subsequently for 1 hour at 100°. The yellow bromination product formed is filtered off at room temperature, washed thoroughly with glacial acetic acid and then with water, and dried at 100° with vacuum. The crude 2-amino - 4 - bromo-6-methylsulfonylbenzothiazol obtained melts at 278°. It is insoluble in alcohol and only slightly soluble in hot glacial acetic acid. The crude product contains 24.96% of bromine, while the theoretical value for the chemically pure compound is 26%.

In the following Table 2 further monoazo dyestuffs are recited which may be produced in an analogous manner and which correspond to the formula

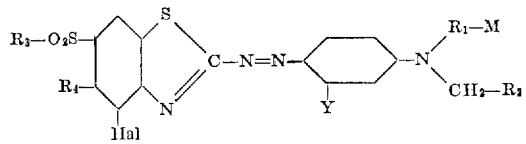

sulfuric acid and 3.8 parts of sodium nitrite is added. After stirring for 4 hours at 0–10° a solution of 22.8 parts of the bisphenylcarbamic acid ester of 3-chloro-N.N-di(hydroxyethyl)-aminobenzene in 50 parts of acetic acid is added and the coupling reaction is accelerated by the dropwise addition of 400 parts of water whereby the resulting new dyestuff is precipitated. It is filtered off, washed free from acid, dried and ground. The described procedure yields a red dyestuff which dyes cellulose acetate in the mass in very brilliant bluish red shades which possess very good fastness to light, washing, cross dyeing, gas fumes, oxylic acid, dry cleaning, and peroxide bleaching. The dyeings are also stable to hydrosulfite.

100 parts of cellulose acetate are mixed for a short time with 300 parts of a mixture of solvents (93% acetone and 7% methanol) and left overnight to swell.

Table 2

| Ex. No. | $R_1$ | $R_2$ | $R_3$ | $R_4$ | M | Y | Hal | Shade |
|---|---|---|---|---|---|---|---|---|
| 62 | $CH_2$ | $CH_2$—CN | $CH_3$ | H | H | H | Cl | Pink. |
| 63 | $C_2H_4$ | $CH_2$—CN | $CH_3$ | H | H | H | Cl | Do. |
| 64 | $C_3H_6$ | $CH_2$—CN | $CH_3$ | H | H | H | Cl | Do. |
| 65 | $C_4H_8$ | $CH_2$—CN | $CH_3$ | H | H | H | Cl | Do. |
| 66 | $C_2H_4$ | $CH_2$—CN | $CH_3$ | H | H | $CH_3$ | Cl | Red violet. |
| 67 | $CH_2$ | $CH_2$—CN | $CH_3$ | H | H | H | Br | Pink. |
| 68 | $C_2H_4$ | $CH_2$—CN | $CH_3$ | H | H | H | Br | Do. |
| 69 | $CH_2$ | $CH_2$—CN | $CH_3$ | H | H | $CH_3$ | Br | Red violet. |
| 70 | $C_2H_4$ | $CH_2$—CN | $CH_3$ | H | H | $CH_3$ | Br | Do. |
| 71 | $C_2H_4$ | $CH_2$—CN | $C_2H_5$ | H | OH | H | Cl | Pink. |
| 72 | $C_2H_4$ | $CH_2$—CN | $C_3H_7$ | H | H | $CH_3$ | Br | Red violet. |
| 73 | $C_2H_4$ | $CH_2$—CN | $C_4H_9$ | H | H | Cl | Br | Red. |
| 74 | $C_2H_4$ | $CH_2$—CN | $CH_2$—CH=$CH_2$ | H | OH | Br | Cl | Red. |
| 75 | $C_2H_4$ | $CH_2$—CN | $CH_3$ | $C_4H_9$ | H | $CF_3$ | Cl | Red. |
| 76 | $C_2H_4$ | $CH_2$—CN | NH—$CH_3$ | H | H | H | Cl | Pink. |
| 77 | $C_2H_4$ | $CH_2$—CN | NH—$CH_3$ | H | H | $CH_3$ | Br | Red violet. |
| 78 | $C_2H_4$ | $CH_2$—CN | NH—$C_2H_5$ | H | H | H | Cl | Pink. |
| 79 | $C_2H_4$ | $CH_2$—CN | NH—$C_2H_5$ | H | H | $C_2H_5$ | Br | Red violet. |
| 80 | $C_2H_4$ | $CH_2$—CN | $N(CH_3)_2$ | H | H | $OCH_3$ | Cl | Do. |
| 81 | $C_2H_4$ | $CH_2$—CN | $N(CH_3)_2$ | H | H | H | Br | Pink. |
| 82 | $C_2H_4$ | $CH_2$—CN | $N(CH_3)_2$ | H | H | $CH_3$ | Cl | Red violet. |
| 83 | $C_2H_4$ | $CH_2$—CN | $N(C_2H_5)_2$ | $C_2H_5$ | H | H | Cl | Pink. |
| 84 | $C_2H_4$ | $CH_2$—CN | NH—$C_3H_7$ | H | H | $CH_3$ | Br | Red violet. |
| 85 | $C_2H_4$ | $CH_2$—CN | NH—$C_4H_9$ | H | H | H | Cl | Pink. |
| 86 | $C_2H_4$ | $CH_2$—CN | $N(CH_3)_2$ | H | H | $CH_3$ | Br | Red violet. |
| 87 | $C_2H_4$ | $CH_2O$—$CH_3$ | $CH_3$ | H | $OCH_3$ | H | Cl | Pink. |
| 88 | $C_2H_4$ | $CH_2O$—$C_2H_5$ | $N(CH_3)_2$ | H | $OC_2H_5$ | $CH_3$ | Cl | Red violet. |
| 89 | $C_2H_4$ | $CH_2O$—CO—$CH_3$ | NH($CH_3$) | H | O—CO—$CH_3$ | H | Br | Pink. |
| 90 | $C_2H_4$ | $CH_2O$—CO—$C_2H_5$ | $N(C_2H_5)_2$ | H | O—CO—$C_2H_5$ | $CH_3$ | Cl | Red violet. |
| 91 | $C_2H_4$ | $CH_2$—O—CO—$C_2H_5$ | $CH_3$ | H | O—CO—$C_2H_5$ | H | Br | Pink. |
| 92 | $C_2H_4$ | $CH_2$—O—CO—$CH_3$ | $N(CH_3)_2$ | H | O—CO—$CH_3$ | $CH_3$ | Br | Red violet. |
| 93 | $C_2H_4$ | $CH_2$—O—CO—$C_2H_5$ | NH($CH_3$) | H | O—CO—$C_2H_5$ | H | Br | Pink. |
| 94 | $C_2H_4$ | $CH_2$—O—CO—$CH_3$ | $N(C_2H_5)_2$ | H | O—CO—$CH_3$ | $CH_3$ | Br | Red violet. |
| 95 | $C_2H_4$ | $CH_2$—O—CO—NH—$C_2H_5$ | $CH_3$ | H | O—CO—NH—$C_2H_5$ | $CH_3$ | Br | Do. |
| 96 | $C_2H_4$ | $CH_2$—O—CO—NH—$C_2H_5$ | $N(CH_3)_2$ | H | O—CO—NH—$C_2H_5$ | $CH_3$ | Br | Do. |
| 97 | $C_2H_4$ | $CH_2$—OH | NH($CH_3$) | H | H | $CH_3$ | Br | Do. |
| 98 | $C_2H_4$ | $C_2H_4$—OH | $N(C_2H_5)_2$ | H | H | $CH_3$ | Br | Do. |
| 99 | $C_2H_4$ | $C_3H_6$—OH | $CH_3$ | H | OH | $CH_3$ | Br | Do. |
| 100 | $C_2H_4$ | $CH_2$—OH | $N(CH_3)_2$ | H | O—CO—$CH_3$ | NH—CO—$CH_3$ | Br | Do. |
| 101 | $C_3H_6$ | $C_2H_4$—O—CO—$CH_3$ | NH($CH_3$) | H | OH | NH—CO—$CH_3$ | Br | Do. |
| 102 | $C_3H_6$ | $C_2H_4$—OH | $N(C_2H_5)_2$ | H | H | NH—CO—$CF_3$ | Br | Violet. |
| 103 | $C_2H_4$ | $CH_2$—OH | $CH_3$ | H | H | NH—CO—$CH_3$ | Br | Do. |
| 104 | $C_2H_4$ | CH(OH)—$CH_2$—OH | $N(CH_3)_2$ | H | OH | NH—CO—$C_2H_5$ | Cl | Do. |
| 105 | $C_2H_4$ | $CH_2$—OH | NH($CH_3$) | H | O—CO—$CH_3$ | NH—CO—$C_2H_5$ | Br | Red violet. |
| 106 | $C_2H_4$ | $CH_2$—O—CO—$CH_3$ | $N(CH_3)_2$ | H | O—CO—$CH_2$—O—$CH_3$ | H | Br | Pink. |
| 107 | $C_2H_4$ | $CH_2$—O—CO—$CH_2$—O—$CH_3$ | $CH_3$ | H | H | $CH_3$ | Br | Do. |
| 108 | $C_2H_4$ | $CHF_2$ | $N(CH_3)_2$ | H | O—CO—$CH_3$ | H | Br | Red. |
| 109 | $C_2H_4$ | $CHF_2$ | NH($CH_3$) | H | H | $CH_3$ | Br | Pink. |
| 110 | $C_2H_4$ | $CF_3$ | $N(C_2H_5)_2$ | H | O—CO—$CH_3$ | H | Br | Red. |
| 111 | $C_3H_6$ | $CF_3$ | $CH_3$ | H | H | $CH_3$ | Br | Pink. |
| 112 | $C_3H_6$ | $CH_2CF_3$ | $N(CH_3)_2$ | H | O—CO—$CH_3$ | H | Br | Red. |
| 113 | $C_3H_6$ | CH($CF_3$)—CN | NH($CH_3$) | H | H | $CH_3$ | Cl | Red violet. |
| 114 | $C_3H_6$ | $C_2H_4$—CN | $N(C_2H_5)_2$ | H | OH | H | Cl | Pink. |
| 115 | $C_3H_6$ | $CHF_2$ | $CH_3$ | H | O—CO—$CH_3$ | H | Br | Red. |
| 116 | $CH_2$ | $CH_2$—CN | $N(CH_3)_2$ | H | O—CO—$CH_3$ | H | Br | Red. |
| 117 | $C_3H_6$ | $CH_2$—CN | NH($CH_3$) | H | O—CO—$CH_3$ | H | Br | Red. |
| 118 | $C_4H_8$ | $CH_2$—CN | $N(C_2H_5)_2$ | H | O—CO—$CH_3$ | H | Br | Red. |
| 119 | $C_2H_4$ | $CH_2$—CN | $CH_3$ | H | O—CO—$CH_3$ | H | Br | Red. |
| 120 | $C_2H_4$ | $CH_2$—CN | $N(CH_3)_2$ | H | O—CO—$CH_3$ | $CH_3$ | Br | Pink. |

Example 121: 15.35 parts of 2-amino-4-bromo-6-methylsulfonylbenzothiazol are dissolved in 400 parts of 85% phosphoric acid at 0°. To the solution thus obtained nitroxylsulfuric acid prepared from 45 parts of concentrated Next day 1 part of the above dyestuff is dissolved in 60 parts of the same solvent mixture by simple shaking and the solution added to the main solution. The whole is stirred in an open mixing kettle until 60 parts of the solvent have evaporated. The dyed mass is pumped into the spinning pot in the usual way and spun. The formed filaments are of bluish red shade and possess excellent fastness to light, washing, cross dyeing, alkaline chlorination, oxalic acid, peroxide, bleaching, gas fumes, dry cleaning and hydrosulfite.

In the following Table 3 further monoazo dyestuffs are recited which are suitable for pigmenting lacquers, oils and synthetic resins and for dyeing man-made fibers in the mass and which correspond to the formula

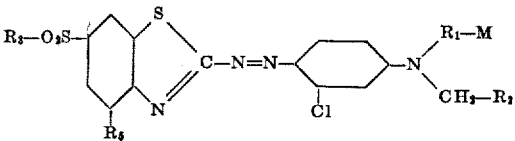

*Table 3*

| Ex. No. | $R_1$ | $R_2$ | $R_3$ | $R_5$ | M | Shade |
|---|---|---|---|---|---|---|
| 122 | $C_2H_4$ | $CH_2$-O-CO-NH-⬡ | $CH_3$ | $NO_2$ | -O-CO-NH-⬡ | Pink. |
| 123 | $C_2H_4$ | $CH_2$-O-CO-NH-⬡ | $N(CH_3)_2$ | $NO_2$ | -O-CO-NH-⬡ | Pink. |
| 124 | $C_2H_4$ | $CH_2$-O-CO-NH-⬡ | $N(C_4H_9)_2$ | $NO_2$ | -O-CO-NH-⬡ | Pink. |
| 125 | $C_2H_4$ | $CH_2$-O-CO-NH-⬡ | $N(C_8H_{17})_2$ | $NO_2$ | -O-CO-NH-⬡ | Pink. |
| 126 | $C_2H_4$ | $CH_2$-O-CO-NH-⬡ | $CH_3$ | Br | -O-CO-NH-⬡ | Pink. |
| 127 | $C_2H_4$ | $CH_2$-O-CO-NH-⬡ | $N(CH_3)_2$ | Br | -O-CO-NH-⬡ | Pink. |
| 128 | $C_2H_4$ | $CH_2$-O-CO-NH-⬡ | $N(C_4H_9)_2$ | Br | -O-CO-NH-⬡ | Pink. |
| 129 | $C_2H_4$ | $CH_2$-O-CO-NH-⬡ | $N(C_8H_{17})_2$ | Cl | -O-CO-NH-⬡ | Pink. |
| 130 | $C_2H_4$ | $CH_2$-O-CO-NH-⬡ | $NH-C_8H_{17}$ | Br | -O-CO-NH-⬡ | Pink. |
| 131 | $C_2H_4$ | $CH_2$-O-CO-NH-⬡ | $N(CH_3)CH_2$-⬡ | Cl | -O-CO-NH-⬡ | Pink. |
| 132 | $C_2H_4$ | $CH_2$-O-CO-NH-⬡ | $NH-CH_2-CH_2$-⬡ | Br | -O-CO-NH-⬡ | Pink. |
| 133 | $C_2H_4$ | $CH_2$-O-CO-NH-⬡ | $N(CH_3)$-⬡ | Br | -O-CO-NH-⬡ | Pink. |
| 134 | $C_2H_4$ | $CH_2$-O-CO-NH-⬡ | $N(C_2H_5)$-⬡ | Br | -O-CO-NH-⬡ | Pink. |
| 135 | $C_2H_4$ | $CH_2$-O-CO-NH-⬡ | $N(CH_2-CH_2-OH)$-⬡ | Br | -O-CO-NH-⬡ | Pink. |
| 136 | $C_2H_4$ | $CH_2$-O-CO-NH-⬡ | NH-⬡-O-$CH_2$-$CH_2$-OH | Br | -O-CO-NH-⬡ | Pink. |
| 137 | $C_3H_7$ | $C_2H_4$-O-CO-NH-⬡ | $N(C_4H_9)_2$ | Cl | -O-CO-NH-⬡ | Pink. |
| 138 | $C_2H_4$ | $CH_2$-O-CO-NH-⬡-$CH_3$ | $N(C_4H_9)_2$ | Br | -O-CO-NH-⬡-$CH_3$ | Pink. |
| 139 | $C_2H_4$ | $CH_2$-O-CO-NH-$C_4H_9$ | $CH_3$ | Br | O-CO-NH-$C_4H_9$ | Pink. |
| 140 | $C_2H_4$ | $CH_2$-O-CO-NH-$C_4H_9$ | $N(CH_3)_2$ | Br | O-CO-NH-$C_4H_9$ | Pink. |
| 141 | $C_2H_4$ | $CH_2$-O-CO-NH-$C_8H_{17}$ | $CH_3$ | Br | O-CO-NH-$C_8H_{17}$ | Pink. |
| 142 | $C_2H_4$ | $CH_2$-O-CO-NH-$C_8H_{17}$ | $N(CH_3)_2$ | Br | O-CO-NH-$C_8H_{17}$ | Pink. |
| 143 | $C_2H_4$ | $CH_2$-O-CO-NH-$C_8H_{17}$ | $N(CH_3)$-⬡ | Br | O-CO-NH-$C_8H_{17}$ | Pink. |
| 144 | $C_2H_4$ | $CH_2$-O-CO-NH-$C_8H_{17}$ | $N(C_2H_5)$-⬡ | Br | O-CO-NH-$C_8H_{17}$ | Pink. |
| 145 | $C_2H_4$ | $CH_2$-O-CO-NH-$C_8H_{17}$ | NH-naphthyl | Br | O-CO-NH-$C_8H_{17}$ | Pink. |
| 146 | $C_2H_4$ | $CH_2$-O-CO-NH-$C_8H_{17}$ | NH-⬡(Cl,Cl) | Br | O-CO-NH-$C_8H_{17}$ | Pink. |
| 147 | $C_2H_4$ | $CH_2$-O-CO-NH-$C_8H_{17}$ | NH-⬡-H | Br | O-CO-NH-$C_8H_{17}$ | Pink. |

Table 3—Continued

| Ex. No. | $R_1$ | $R_2$ | $R_3$ | $R_5$ | M | Shade |
|---|---|---|---|---|---|---|
| 148 | $C_2H_4$ | $CH_2$-O-CO-NH-⟨⟩-$C_8H_{17}$ | $N(CH_3)_2$ | Br | -O-CO-NH-⟨⟩-$C_8H_{17}$ | Pink. |
| 149 | $C_2H_4$ | $CH_2$-O-CO-$CH_3$ | $N(C_4H_9)_2$ | Cl | -O-CO-$CH_3$ | Red. |
| 150 | $C_2H_4$ | $CH_2$-O-CO-$CH_3$ | NH-$C_8H_{17}$ | Br | -O-CO-$CH_3$ | Red. |
| 151 | $C_2H_4$ | $CH_2$-O-CO-$CH_3$ | $N(C_{12}H_{25})_2$ | Br | -O-CO-$CH_3$ | Red. |
| 152 | $C_2H_4$ | $CH_2$-O-CO-$C_2H_5$ | $C_3H_7$ | Br | -O-CO-$C_2H_5$ | Red. |
| 153 | $C_2H_4$ | $CH_2$-CN | $N(C_4H_9)_2$ | Br | -O-CO-$CH_3$ | Red. |
| 154 | $C_2H_4$ | $CH_2$-CN | $CH_3$ | Br | -O-CO-$CH_3$ | Red. |
| 155 | $C_2H_4$ | $CH_2$-CN | $N(CH_2\text{-}CH_2\text{-}OH)_2$ | Br | -O-CO-$CH_3$ | Red. |
| 156 | $C_2H_4$ | $CH_2$-CN | $N(CH_2\text{-}CH\begin{smallmatrix}OH\\CH_3\end{smallmatrix})_2$ | Br | -O-CO-$CH_3$ | Red. |

Further dyestuffs which are suitable for dyeing cellulose acetate fibers in the dope correspond to the formula Example 157:

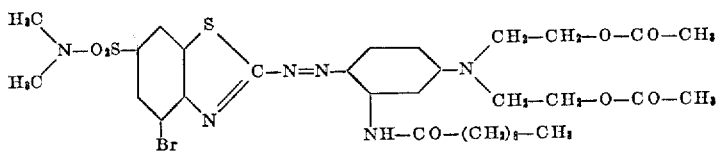

and

Example 158:

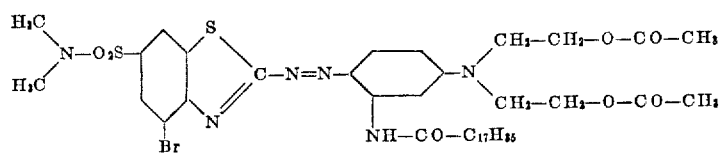

Formulae of representative dyestuffs of the foregoing examples are as follows.

Example 49:

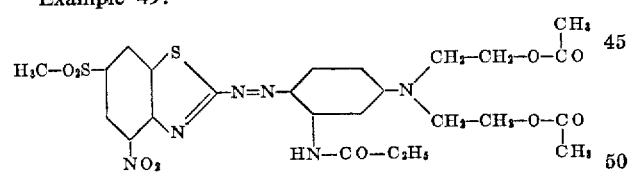

Example 70:

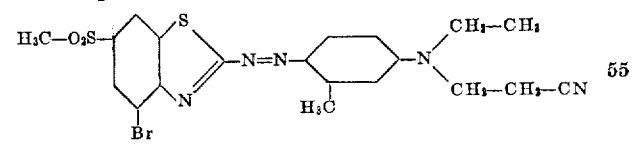

Example 89:

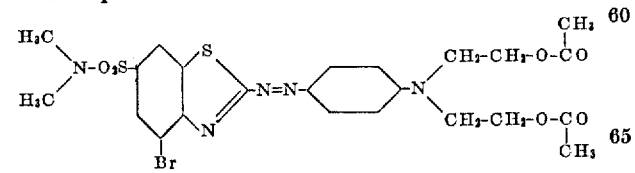

Example 106:

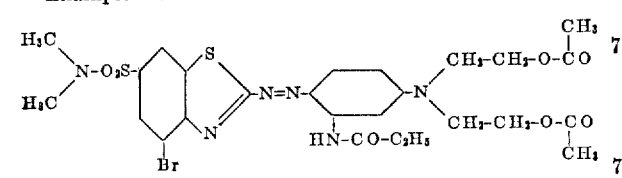

Example 127:

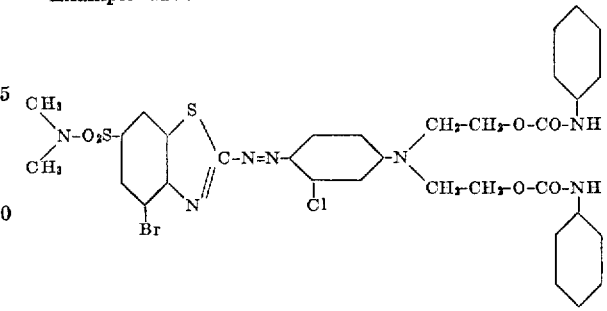

Having thus disclosed the invention what we claim is:
1. Monoazo dyestuff of the benzothiazol series of the formula

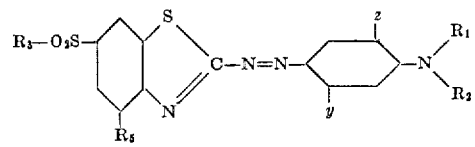

wherein
$R_1$ is a member selected from the group consisting of methyl, ethyl, acetoxyethyl, hydroxyethyl and

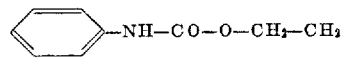

$R_2$ is a member selected from the group consisting of acetoxyethyl, cyanethyl, hydroxyethyl, dihydroxypropyl and

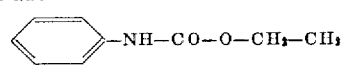

$R_3$ is a member selected from the group consisting of methyl, ethyl, dimethylamino and diethylamino, $R_5$ is a member selcted from the group consisting of chlorine and bromine, y is a member selected from the group consisting of hydrogen, chlorine, methyl, ethyl, acetylamino and propionylamino and z is a meber selcted from the group consisting of hydrogen, methoxy and ethoxy.

2. The monoazo dyestuff of the benzothiazol series which corresponds to the formula

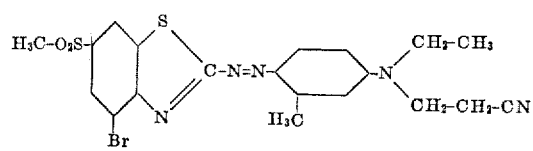

3. The monoazo dyestuff of the benzothiazol series which corresponds to the formula

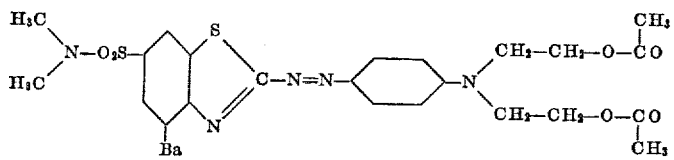

4. The monoazo dyestuff of the benzothiazol series which corresponds to the formula

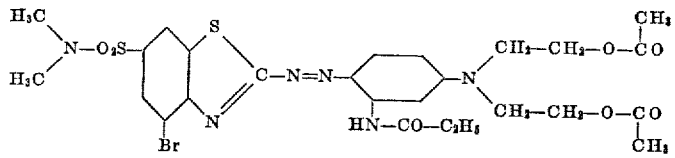

5. The monoazo dyestuff of the benzothiazol series which corresponds to the formula

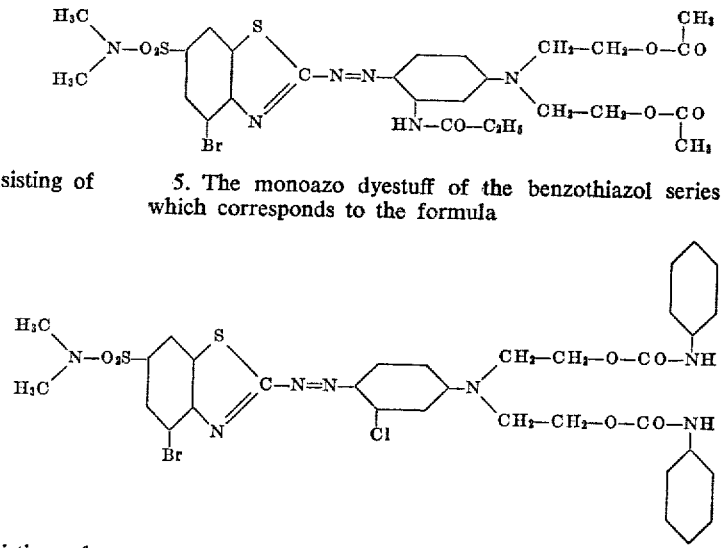

6. A monoazo dyestuff of the benzothiazol series which corresponds to the formula

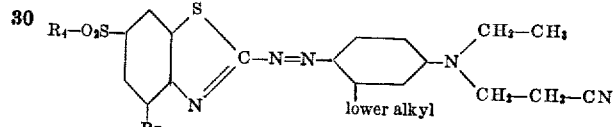

wherein $R_3$ represents alkyl with 1 to 4 carbon atoms.

7. A monoazo dyestuff of the benzthiazol series which corresponds to the formula

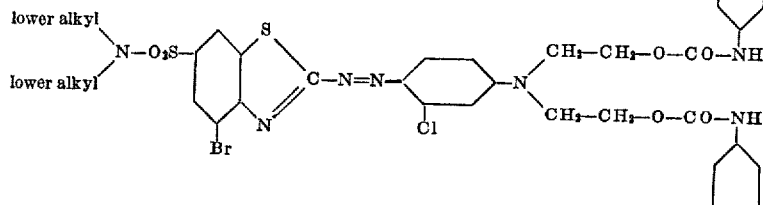

wherein each of the lower alkyl groups has maximally 12 carbon atoms.

References Cited in the file of this patent
UNITED STATES PATENTS

| | | |
|---|---|---|
| 2,345,010 | Seymour et al. | Mar. 28, 1944 |
| 2,785,157 | Straley et al. | Mar. 12, 1957 |
| 2,832,761 | Straley et al. | Apr. 29, 1958 |
| 2,889,315 | Bossard et al. | June 2, 1959 |

UNITED STATES PATENT OFFICE
CERTIFICATE OF CORRECTION

Patent No. 3,105,829                                                  October 1, 1963

Ernest Merian et al.

It is hereby certified that error appears in the above numbered patent requiring correction and that the said Letters Patent should read as corrected below.

Column 3, line 11, for "spltitable" read -- splittable --; column 4, line 15, for "acetylaminobnezene" read -- acetylaminobenzene --; column 7, lines 74 and 75, for "nitroxylsulfuric" read -- nitrosylsulphuric --; column 13, line 29, for "meber" read -- member --; same column 13, for that portion of the formula in claim 3 reading

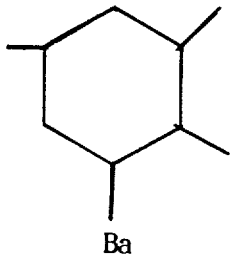 read 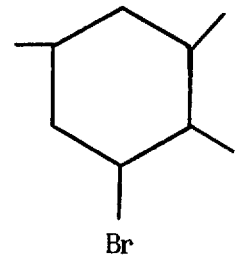

Signed and sealed this 9th day of June 1964.

(SEAL)
Attest:

ERNEST W. SWIDER                                          EDWARD J. BRENNER

Attesting Officer                                             Commissioner of Patents